United States Patent Office 3,335,997
Patented Aug. 15, 1967

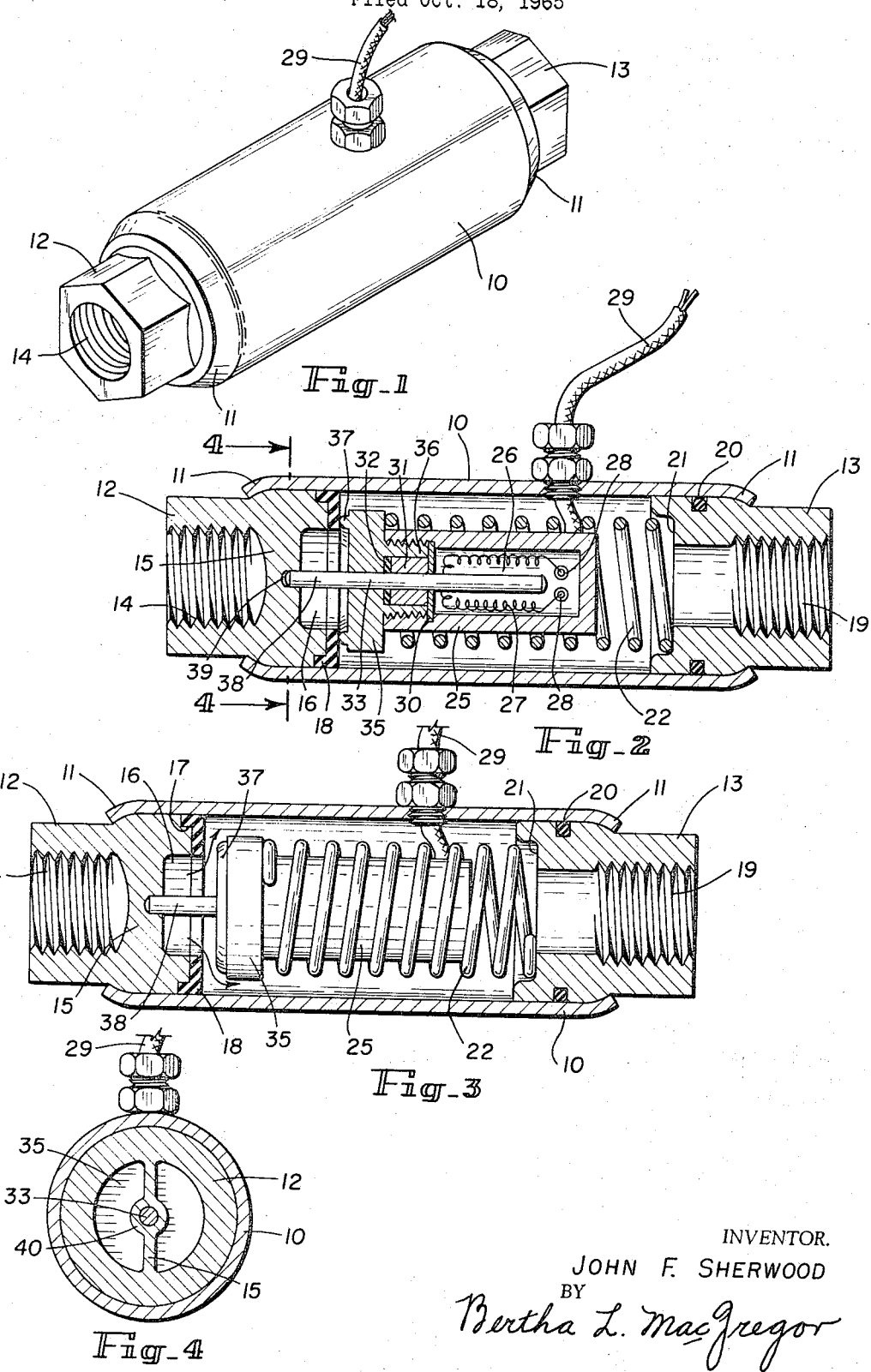

3,335,997
VALVE CONTROLLED BY A THERMAL MOTOR
John F. Sherwood, Wheat Ridge, Colo., assignor to Thermal Hydraulics, Inc., a corporation of California
Filed Oct. 18, 1965, Ser. No. 496,858
10 Claims. (Cl. 251—11)

ABSTRACT OF THE DISCLOSURE

A valve comprising a housing in which is mounted an electrothermal motor having a high pressure casing containing expansible material, a heating element and a piston shaft, one end of the shaft extending outwardly beyond the motor casing into the valve housing and being mounted so that the shaft is stationary and the high pressure casing, with its expansible material and heating element, is movable in axial directions relatively to the shaft and valve housing. The end wall of the high pressure casing constitutes part of the valve seat for controlling fluid passing through the valve housing. The heating element is connected to an electrical current source.

---

This invention relates to valves suitable for installation in underground sprinkler systems and other fluid conveying conduits, and particularly to a valve automatically controlled by a switchless thermal motor.

One object of the invention is to provide a valve exceptionally simple in construction, highly dependable in operation, which consists of parts which do not involve expensive castings and machining processes.

A unique feature of the valve construction is the utilization of a thermal motor as part of the valve seat, and the arrangement whereby the thermal motor housing and contents, except the motor shaft, are movable. The shaft is stationary.

My U.S. Patent No. 3,029,595 shows an electro-thermal actuator which comprises a high pressure casing and a reciprocatory shaft which has a piston portion in the casing and a work-contacting portion extending beyond the casing. The shaft is actuated by expansible material heated by electrical means controlled by switch mechanism located in the casing and connected to a source of electrical current. Actuators of the kind described in my aforementioned patent are employed to actuate dampers, valves, shutters and other devices, by contact of the actuator shaft with the mechanism to be actuated. These actuators depend on the switch mechanism to open the circuit at a pre-determined time to permit the expansible material to cool and allow the shaft to be retracted by suitable means. Failure of the switch mechanism to function properly results in overheating and ultimate destruction of the actuator due to the continuous input of electrical current.

I have produced a switchless electrothermal actuator for imparting motion to mechanism and to provide means for controlling the generation of heat within the actuator without interrupting the constant flow of electrical current thereto, which is the subject of my copending application for U.S. patent Ser. No. 415,330, filed Dec. 2, 1964. In that embodiment, the electrothermal switchless actuator shaft is movable and the high pressure housing is stationary relatively to the main housing of the valve or other device in which the actuator as a whole is installed for imparting motion to mechanism.

In the embodiment of my invention shown and described herein, a switchless electrothermal motor provided with a high pressure casing and an actuator shaft are mounted in a valve housing in such manner that the shaft is stationary and the high pressure casing is movable relatively to the main housing of the valve, and the actuator casing and contents (except the shaft) constitute part of the valve seat movable relatively to a fixed part of the valve housing for controlling the flow of water or other fluid therethrough.

The valve of this invention comprises a "straight through" construction in which the shell or outside housing can be made of straight tubing, and inlet and outlet members at opposite ends of the housing can be applied by turning, which eliminates the need for couplings during installation. The valve functions very efficiently although small in size, an important factor in the replacement of existing valves which have become worn or otherwise faulty In the drawings:

FIG. 1 is an isometric elevational view of a valve housing embodying my invention.

FIG. 2 is a longitudinal vertical sectional view of the same, showing the valve seat in "closed" position.

FIG. 3 is similar to FIG. 2, showing the valve seat in "open" position.

FIG. 4 is a transverse vertical sectional view in the plane of the line 4—4 of FIG. 2.

In that embodiment of the invention shown in the drawings, the valve housing 10 is tubular between its slightly inturned ends 11 which engage an inlet coupling 12 and an outlet coupling 13. The coupling 12 is provided with a cylindrical inlet opening defined by threaded wall 14, and is integrally formed with a laterally extending cross web 15 with inner recess 16. The inner surface of the coupling 12 is offset at 17 to provide a bearing surface for the flanged rubber gasket 18. The coupling 13 is provided with a cylindrical outlet opening defined by threaded wall 19. The circumferential surface of the coupling 13 is grooved to receive an O-ring 20, and the inner surface of the coupling is recessed at 21 to form a seat for the spring 22. The couplings 12, 13, fit within the ends of the main housing 10 and are installed in a water line by the threaded ends 14, 19, respectively, for flow of water through the valve.

The combined thermal motor and valve seat comprise a high pressure casing 25, chamber 26 containing expansible material such as wax, for example, an electrical heating element 27, electrodes 28, and electrical current wires 29 leading to a source of electrical current. A piston seal is designated 30, shaft bearing 31, and lubricant seal 32. The motor shaft 33 has an inner piston portion and extends through the seals and bearing, and through a valve seat 35 integral with an externally threaded sleeve 36. The threaded sleeve 36 engages threads on the inner surface of the high pressure casing 25. When applied to the casing 25 the valve seat body serves to close the open end of the high pressure casing 25. The valve seat body 35 is provided with a seating ring 37 which contacts the gasket 18 on the inlet coupling 12 when the thermal motor and valve seat are in the closed position of FIG. 2.

The valve normally is closed as shown in FIG. 2, with the valve seat ring 37 bearing on the gasket 18 on the inlet coupling 12. When electrical current through wires 29 heats the element 27, and the expansible material in chamber 26 becomes heated, the material expands and forces the thermal motor to move bodily to the right into the position shown in FIG. 3. This action occurs because the shaft 33 cannot move, being restrained by bearing on its free end 38 against the inner surface of the recess 39 in the enlarged center 40 of the web 15. This movement of the thermal motor results in opening of the valve by separation of the valve seat 35 and seating ring 37 from the gasket 18, as shown in FIG. 3. The spring 22 which surrounds the high pressure casing 25 is compressed by this valve opening movement.

For normal operation of the valve in a water flow system, the electrical current input is predetermined to heat the thermal motor sufficiently to keep the valve seat 35 in the open position of FIG. 3 until the power is turned off. Then cooling of the motor and contraction of the expansible material permits the thermal motor and valve seat 35 to move under influence of the spring 22 to the valve closing position. The constant electrical input is predetermined with consideration for the cooling effect of the water flow through the valve. The dependable uniform operation of the thermal motor to open the valve when power is turned on and to close the valve when turned off permits remote control of the valved system with a minimum of parts within the valve.

Changes may be made in details of construction and in the form and arrangement of parts without departing from the scope of the invention as defined by the appended claims.

I claim:
1. A valve controlled by a thermal motor comprising
   (a) a valve housing provided with inlet and outlet openings,
   (b) a thermal motor mounted in the housing between said openings, said motor comprising a high pressure casing, expansible material and a shaft in the casing having one end extending beyond the casing,
   (c) bearing means in the housing adjacent the inlet opening for bearing on the shaft and preventing movement of the shaft,
   (d) a valve seat on the motor casing movable with the casing for seating on the valve housing and closing said inlet opening,
   (e) yielding means urging the casing and valve seat into inlet closing position,
   (f) a heating element in the high pressure casing causing expansion of the material in the casing and movement in axial direction of the casing, expansible material and heating element relatively to the shaft to move the casing and valve seat into inlet opening position when the material is heated, and
   (g) means connecting the heating element to an electrical current source.

2. A valve controlled by a thermal motor comprising
   (a) a tubular valve housing,
   (b) threaded inlet and outlet couplings connected to opposite ends of the housing,
   (c) a thermal motor mounted in the housing between said inlet and outlet couplings, said motor comprising a high pressure casing, expansible material and a shaft in the casing having one end extending beyond the casing,
   (d) bearing means on the inlet coupling for bearing on the end of the shaft and preventing movement of the shaft,
   (e) a valve seat on the motor casing movable with the casing for seating on the bearing means and closing said inlet coupling,
   (f) yielding means urging the casing and valve seat into inlet closing position,
   (g) a heating element in the high pressure casing causing expansion of the material in the casing and movement in axial direction of the casing, expansible material and heating element relatively to the shaft to move the casing and valve seat into inlet opening position when the material is heated, and
   (h) means connecting the heating element to an electrical current source.

3. The valve defined by claim 2, in which the bearing means on the inlet coupling includes a web which extends across the inlet opening for engagement with the shaft end, and the inlet coupling is provided with an annular face for contacting the end of the high pressure casing.

4. The valve defined by claim 2, in which the valve seat on the motor casing includes a sleeve member secured to the casing, and the seat constitutes an end wall closing the high pressure casing.

5. A valve controlled by a thermal motor comprising
   (a) a tubular valve housing,
   (b) internally threaded inlet and outlet couplings connected to opposite ends of the housing,
   (c) a resilient gasket adjacent the inner face of the inlet coupling and having a flange located between the coupling and the tubular housing,
   (d) the outlet coupling being provided with a recess on its inner face,
   (e) a thermal motor in the housing between said inlet and outlet couplings, said motor comprising a high pressure casing, expansible material and a shaft in the casing having one end extending beyond the casing toward the inlet coupling,
   (f) a web extending across the inlet coupling for bearing on the end of the shaft and preventing movement of the shaft,
   (g) a valve seat member on the motor casing movable with the casing for seating on the bearing means and closing said inlet coupling, said valve seat having a central opening through which the shaft extends for contact with the web,
   (h) a coiled spring surrounding the thermal motor casing having one end in the recess of the outlet coupling and the other end bearing against the valve seat member, and
   (i) a heating element causing expansion of the material in the motor casing and movement in axial direction of the motor casing relatively to the shaft to move the casing and valve seat member into inlet opening position when the material is heated.

6. A valve controlled by a thermal motor comprising
   (a) a tubular valve housing,
   (b) threaded inlet and outlet couplings connected to opposite ends of the housing,
   (c) a thermal motor mounted in the housing between said inlet and outlet couplings, said motor comprising a high pressure casing, expansible material and a shaft in the casing having one end extending beyond the casing,
   (d) bearing means on the inlet coupling for bearing on the end of the shaft and preventing movement of the shaft,
   (e) a valve seat on the motor casing movable with the casing for seating on the bearing means and closing said inlet coupling, said valve seat including a sleeve member secured to the casing, and shaft bearing and sealing means located in said sleeve, with the shaft extending through said shaft bearing, sealing means and valve seat into contact with the bearing means on the inlet coupling,
   (f) yielding means urging the casing and valve seat into inlet closing position,
   (g) a heating element in the high pressure casing causing expansion of the material in the casing and movement in axial direction of the casing, expansible material and heating element relatively to the shaft to move the casing and valve seat into inlet opening position when the material is heated, and
   (h) means connecting the heating element to an electrical current source.

7. A valve controlled by a thermal motor comprising
   (a) a tubular valve housing,
   (b) threaded inlet and outlet couplings connected to opposit ends of the housing,
   (c) a thermal motor mounted in the housing between said inlet and outlet couplings, said motor comprising a high pressure casing, expansible material and a shaft in the casing having one end extending beyond the casing,
   (d) bearing means on the inlet coupling for bearing on the end of the shaft and preventing movement of the shaft, (e) a valve seat on the motor casing movable with the casing for seating on the bearing means and closing said inlet coupling,
(f) yielding means urging the casing and valve seat into inlet closing position, said yielding means comprising a coiled spring surrounding the motor casing having one end bearing on the inner end of the outlet coupling and the other end against the valve seat,
(g) a heating element in the high pressure casing causing expansion of the material in the casing and movement in axial direction of the casing, expansible material and heating element relatively to the shaft to move the casing and valve seat into inlet opening position when the material is heated, and
(h) means connecting the heating element to an electrical current source.

8. A valve controlled by a thermal motor comprising
(a) a tubular valve housing,
(b) threaded inlet and outlet couplings connected to opposite ends of the housing, including a resilient gasket adjacent the inner face of the inlet coupling, said gasket extending around the peripheral surface of the inlet coupling between said coupling and the tubular valve housing,
(c) a thermal motor mounted in the housing between said inlet and outlet couplings, said motor comprising a high pressure casing, expansible material and a shaft in the casing having one end extending beyond the casing,
(d) bearing means on the inlet coupling for bearing on the end of the shaft and preventing movement of the shaft,
(e) a valve seat on the motor casing movable with the casing for seating on the bearing means and closing said inlet coupling,
(f) yielding means urging the casing and valve seat into inlet closing position,
(g) a heating element in the high pressure casing causing expansion of the material in the casing and movement in axial direction of the casing, expansible material and heating element relatively to the shaft to move the casing and valve seat into inlet opening position when the material is heated, and
(h) means connecting the heating element to an electrical current source.

9. The valve defined by claim 8, in which the valve seat has an axially projecting ring on its face for contacting the gasket.

10. A valve controlled by an electrothermal motor comprising
(a) a straight tubular valve housing threaded at opposite ends and provided with inlet and outlet openings,
(b) threaded inlet and outlet couplings connected to opposite threaded ends of the housing,
(c) an electrothermal motor mounted in the housing between said openings, said motor comprising a high pressure casing containing expansible material and a shaft having one end extending beyond the casing,
(d) means preventing movement of the shaft,
(e) the motor casing having an end wall for seating on the valve housing and closing said inlet opening,
(f) yielding means urging the casing and valve seat into inlet closing position,
(g) a heating element in the high pressure casing causing expansion of the material in the casing and movement of the casing, expansible material and heating element relatively to the shaft to move the casing and valve seat into inlet opening position when the material is heated, and
(h) means connecting the heating element to an electrical current source.

References Cited
UNITED STATES PATENTS

| 2,419,630 | 4/1947 | Cruzan et al. | 137—468 X |
| 2,484,405 | 10/1949 | Eskin | 60—23 X |

FOREIGN PATENTS 203,841  10/1956  Australia.

M. CARY NELSON, *Primary Examiner.*

A. ROSENTHAL, *Examiner.*

UNITED STATES PATENT OFFICE
CERTIFICATE OF CORRECTION

Patent No. 3,335,997                                  August 15, 1967

John F. Sherwood

It is hereby certified that error appears in the above numbered patent requiring correction and that the said Letters Patent should read as corrected below.

In the heading to the printed specification, lines 3 and 4, for "Thermal Hydraulics, Inc." read -- Thermal Hydraulics Corporation --.

Signed and sealed this 25th day of June 1968.

(SEAL)
Attest:

Edward M. Fletcher, Jr.                              EDWARD J. BRENNER
Attesting Officer                                         Commissioner of Patents